United States Patent
Akahane et al.

(10) Patent No.: US 7,809,859 B2
(45) Date of Patent: Oct. 5, 2010

(54) NETWORK SWITCHING DEVICE AND CONTROL METHOD OF NETWORK SWITCHING DEVICE

(75) Inventors: Shinichi Akahane, Hachioji (JP); Mitsuru Nagasaka, Kokubunji (JP); Hiroki Yano, Toyota (JP); Yutaka Takagi, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 295 days.

(21) Appl. No.: 11/831,109

(22) Filed: Jul. 31, 2007

(65) Prior Publication Data

US 2008/0052487 A1 Feb. 28, 2008

(30) Foreign Application Priority Data

Aug. 25, 2006 (JP) .............................. 2006-229028

(51) Int. Cl.
*G06F 15/16* (2006.01)
(52) U.S. Cl. ...................... 709/245; 709/242; 711/207
(58) Field of Classification Search ................ 709/242, 709/245; 711/207
See application file for complete search history.

(56) References Cited

U.S. PATENT DOCUMENTS

| | | | | |
|---|---|---|---|---|
| 5,757,795 | A * | 5/1998 | Schnell | 370/392 |
| 5,953,335 | A * | 9/1999 | Erimli et al. | 370/390 |
| 6,760,341 | B1 * | 7/2004 | Erimli et al. | 370/412 |
| 7,257,643 | B2 * | 8/2007 | Mathew et al. | 709/238 |
| 7,263,593 | B2 * | 8/2007 | Honda et al. | 711/205 |
| 2003/0210696 | A1 * | 11/2003 | Goldflam | 370/395.1 |
| 2004/0068589 | A1 * | 4/2004 | Witkowski et al. | 709/249 |
| 2004/0158663 | A1 * | 8/2004 | Peleg | 710/100 |
| 2008/0092214 | A1 * | 4/2008 | Zavalkovsky et al. | 726/4 |
| 2008/0250123 | A1 * | 10/2008 | Chae et al. | 709/220 |

FOREIGN PATENT DOCUMENTS

| JP | 5-199230 | 8/1993 |
|---|---|---|
| JP | 7-202930 | 8/1995 |
| JP | 2002-111695 | 4/2002 |

* cited by examiner

*Primary Examiner*—Nathan Flynn
*Assistant Examiner*—Mohamed Wasel
(74) *Attorney, Agent, or Firm*—Brundidge & Stanger, P.C.

(57) ABSTRACT

A network switching device includes multiple ports, multiple switching processors, and a table manager. The switching processors respectively have an address table, a output port specification module, an update requirement determination module, and a table update module. The output port specification module refers to a destination address in received data and the address table and specifies a output port for sending the data among the multiple ports. The update requirement determination module determines requirement for update of the address table with regard to a source address in the data. The table manager has an update detail acquisition module and an update request module. Upon determination of the requirement for update of the address table, the update detail acquisition module obtains an update detail of the address table from one of the switching processors. The update request module sends an update request to the switching processors, based on the update detail.

10 Claims, 12 Drawing Sheets

| VLAN IDENTIFICATION | DESTINATION MAC ADDRESS | OUTPUT PORT |
|---|---|---|
| VLAN-1 | MAC-T1 | P1-1 |
| VLAN-2 | MAC-T2 | P2-1 |
| VLAN-1 | MAC-Tn | Pn-1 |
| ⋮ | ⋮ | ⋮ |

| PORT | VLAN IDENTIFICATION |
|---|---|
| P1-1 | VLAN-1 |
| P2-1 | VLAN-2 |
| Pn-1 | VLAN-1 |
| ⋮ | ⋮ |

E1, E2, E3

NETWORK SWITCHING DEVICE AND CONTROL METHOD OF NETWORK SWITCHING DEVICE

CROSS REFERENCE TO RELATED APPLICATIONS

This application relates to and claims priority from Japanese Patent Applications No. 2006-229028, filed on Aug. 25, 2006, the entire disclosure of which is incorporated by reference.

BACKGROUND

1. Technical Field

The present invention relates to a network switching device and a control method of the network switching device.

2. Description of the Related Art

A conventionally used network switching device (for example, a layer 2 switch) relays data, based on a destination address such as MAC address related to the data. The network switching device has multiple switching processors, which individually store address tables and specify a output port of the data based on the destination address. The network switching device requires a management system for standardizing the contents of the respective address tables.

In a prior art network switching device adopting a proposed technique, each of multiple switching processors manages a local MAC address table, while a management CPU manages a master MAC address table. The master MAC address table has the integrated storage representing the contents of the multiple local MAC address tables. Each of the multiple switching processors refers to the master MAC address table when a destination MAC address of received data is not present in its local MAC address table. Every time its local MAC address table is updated, each switching processor notifies the management CPU of update information for registration of the update information into the master MAC address table.

In this prior art network switching device, the management CPU manages the master MAC address table and accordingly requires a memory capacity for storage of the master MAC address table. Each of the multiple switching processors refers to the master MAC address table when the destination MAC address of the received data is not present in its local MAC address table. This may undesirably increase the processing load in each of the multiple switching processors.

SUMMARY

An advantage of some aspects of the invention is, in a network switching device having multiple switching processors respectively storing address tables, to efficiently standardize the contents of the respective address tables.

A first aspect of the present invention provides a network switching device that includes multiple ports for receiving and sending data, multiple switching processors, and a table manager. Each of the multiple switching processors has a storage, a output port specification module, an update requirement determination module, and a table update module. The storage stores an address table recording a mapping of destination information including a destination address to one of the multiple ports. The output port specification module refers to at least a destination address included in the received data and the address table and specifies a output port for sending the received data among the multiple ports. The update requirement determination module determines requirement or non-requirement for update of the address table with regard to a source address included in the received data. The table update module updates the address table in response to an update request. The table manager has an update detail acquisition module and an update request module. Upon determination of the requirement for update of the address table by the update requirement determination module in one of the multiple switching processors, the update detail acquisition module obtains an update detail of the address table from one of the multiple switching processors. The update request module sends the update request to each of the multiple switching processors, based on the obtained update detail.

According to the network switching device pertaining to the first aspect, the table manager sends the update request of the address table to each of the multiple switching processors. Each of the multiple switching processors updates the content of the address table under management in response to the received update request. This switching device efficiently standardizes the contents of the respective address tables stored in the multiple switching processors.

In the switching device pertaining to the first aspect, at least one of the multiple switching processors may have an update detail identification module that identifies the update detail in response to an identification request. The update detail acquisition module may include an identification request sending module that sends the identification request to one of the at least one of the multiple switching processors, and an update detail receiving module that receives the identified update detail from one of the multiple switching processors which has the update detail identification module. In this arrangement, the table manager sends the identification request to the switching processor having the update detail identification module and obtains the identified update detail from the switching processor having the update detail identification module.

In the switching device pertaining to the first aspect, the update detail identification module may identify the update detail as either a new registration operation to newly register the mapping of a new address or a rewriting operation to rewrite the mapping of a registered address.

In the switching device pertaining to the first aspect, plural switching processors among the multiple switching processors may have the update detail identification module. The update detail acquisition module has a receiver specification module that specifies a receiver as a destination of sending the identification request among the plural switching processors having the update detail identification module. This arrangement distributes the required processing for updating the address table to the plural switching processors and thereby ensures the high-speed update of the contents of the respective address tables included in the multiple switching processors.

In the switching device pertaining to the first aspect, the receiver specification module may specify a predetermined switching processor as the receiver among the plural switching processors having the update detail identification module. For example, a switching processor having a low processing load may be set in advance as the receiver. This arrangement enables the high-speed update of the contents of the respective address tables included in the multiple switching processors.

In the switching device pertaining to the first aspect, the receiver specification module may monitor a processing load in each of the plural switching processors having the update detail identification module and specify a switching processor having a lower processing load among the plural switching processors having the update detail identification module as the receiver. In this arrangement, the switching processor having the lower processing load is automatically specified to the receiver that takes charge of identification of the update detail. This arrangement effectively ensures the high-speed update of the contents of the respective address tables included in the multiple switching processors.

In the switching device pertaining to the first aspect, the receiver specification module may sequentially specify the plural switching processors having the update detail identification module as the receiver. In this arrangement, the required processing for identifying the update detail is sequentially distributed to one of the plural switching processors. This arrangement effectively ensures the high-speed update of the contents of the respective address tables included in the multiple switching processors.

In the switching device pertaining to the first aspect, the address may be an address of a data link layer.

In the switching device pertaining to the first aspect, the destination information includes VLAN identification for identifying a VLAN, in addition to the destination address. The output port specification module specifies the output port for sending the received data among the multiple ports, based on the destination address of the received data and the VLAN identification information for identifying a VLAN of the received data. In this arrangement, the network switching device efficiently standardizes the contents of the address tables including the VLAN identification information.

The technique of the present invention is not restricted to the network switching device having any of the above arrangements but is also actualized by diversity of other applications, for example, a control method of the network switching device having multiple ports, computer programs executed to attain the functions of the network switching device or the control method, recording media with such computer programs recorded therein, and data signals including such computer programs and being embodied in carrier waves.

The above and other objects, characterizing features, aspects and advantages of the invention will be clear from the description of preferred embodiments presented below along with the attached figures.

BRIEF DESCRIPTION OF THE DRAWINGS

FIGS. 13A-B show a MAC address table and a VLAN table adopted in a fourth variation.

DETAILED DESCRIPTION OF THE PREFERRED EMBODIMENTS

A. First Embodiment

Configuration of Network Switching Device

Figure 1:
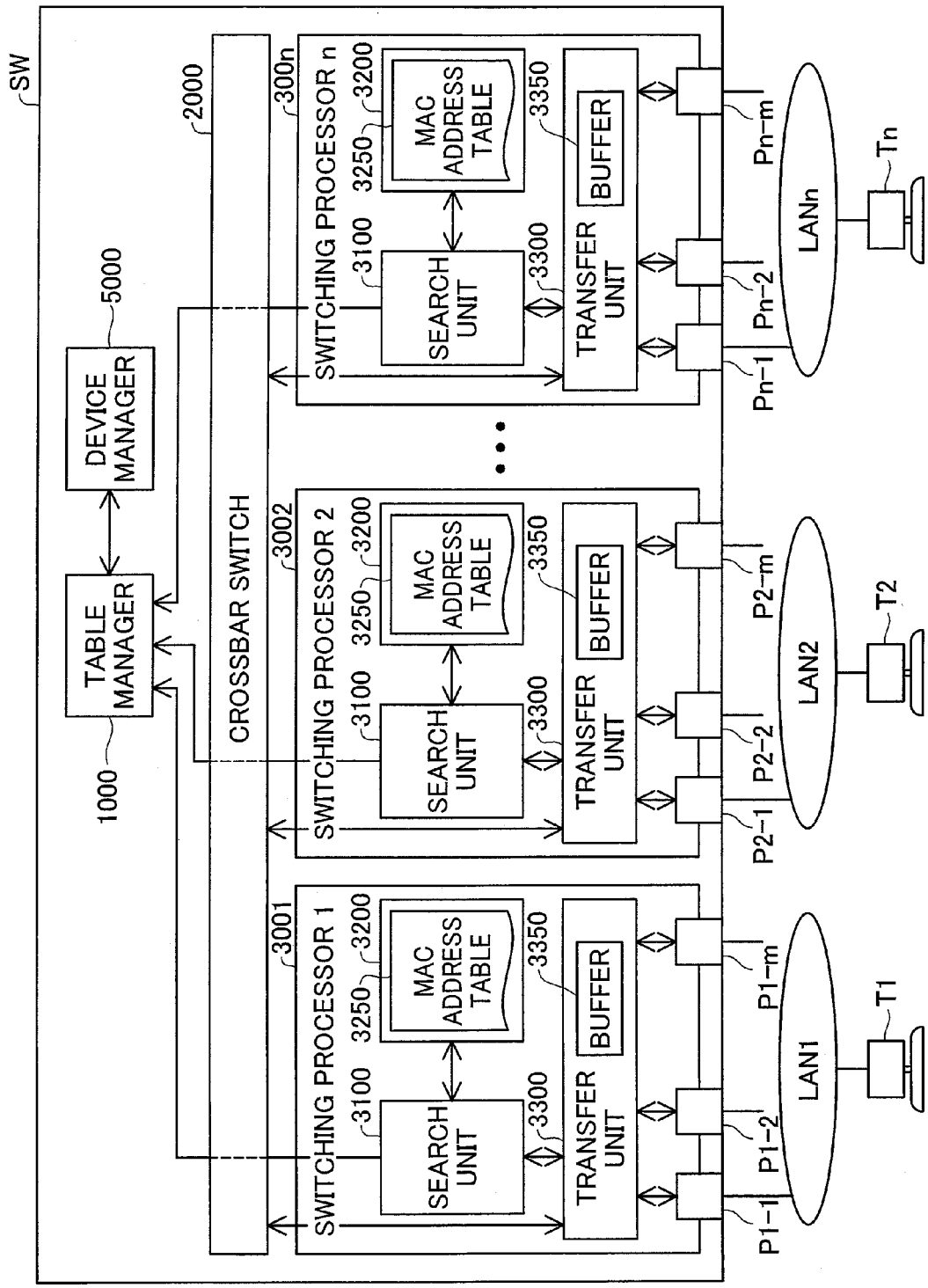
FIG. 1 is a block diagram schematically illustrating the structure of a network switching device in a first embodiment.
Figure 2:
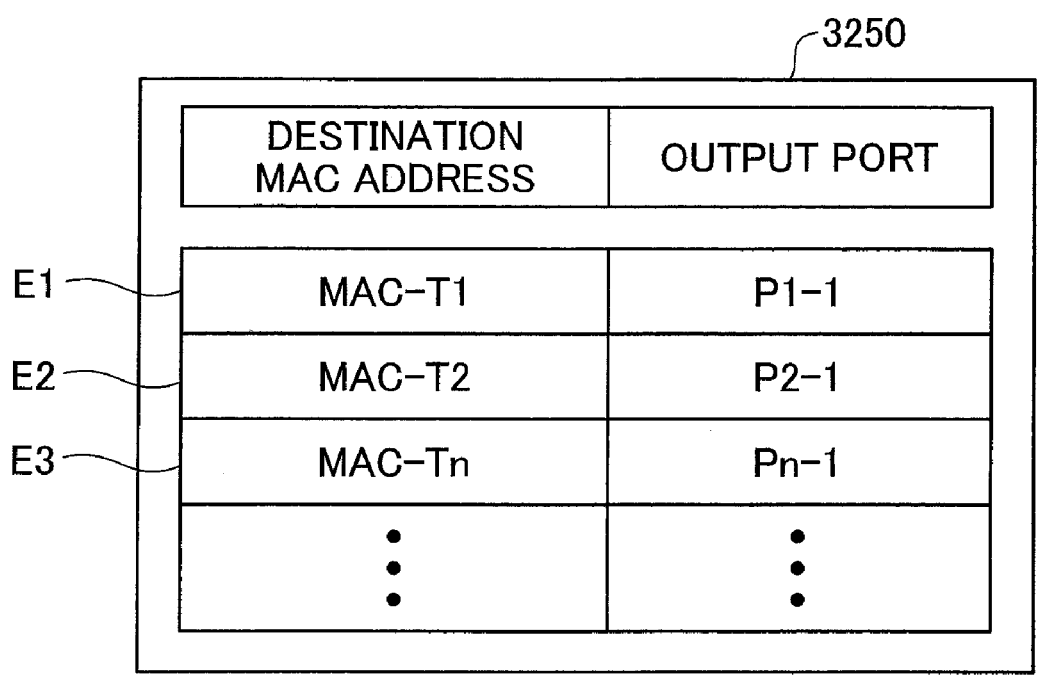
FIG. 2 shows one example of a MAC address table adopted in the network switching device.
Figure 3:
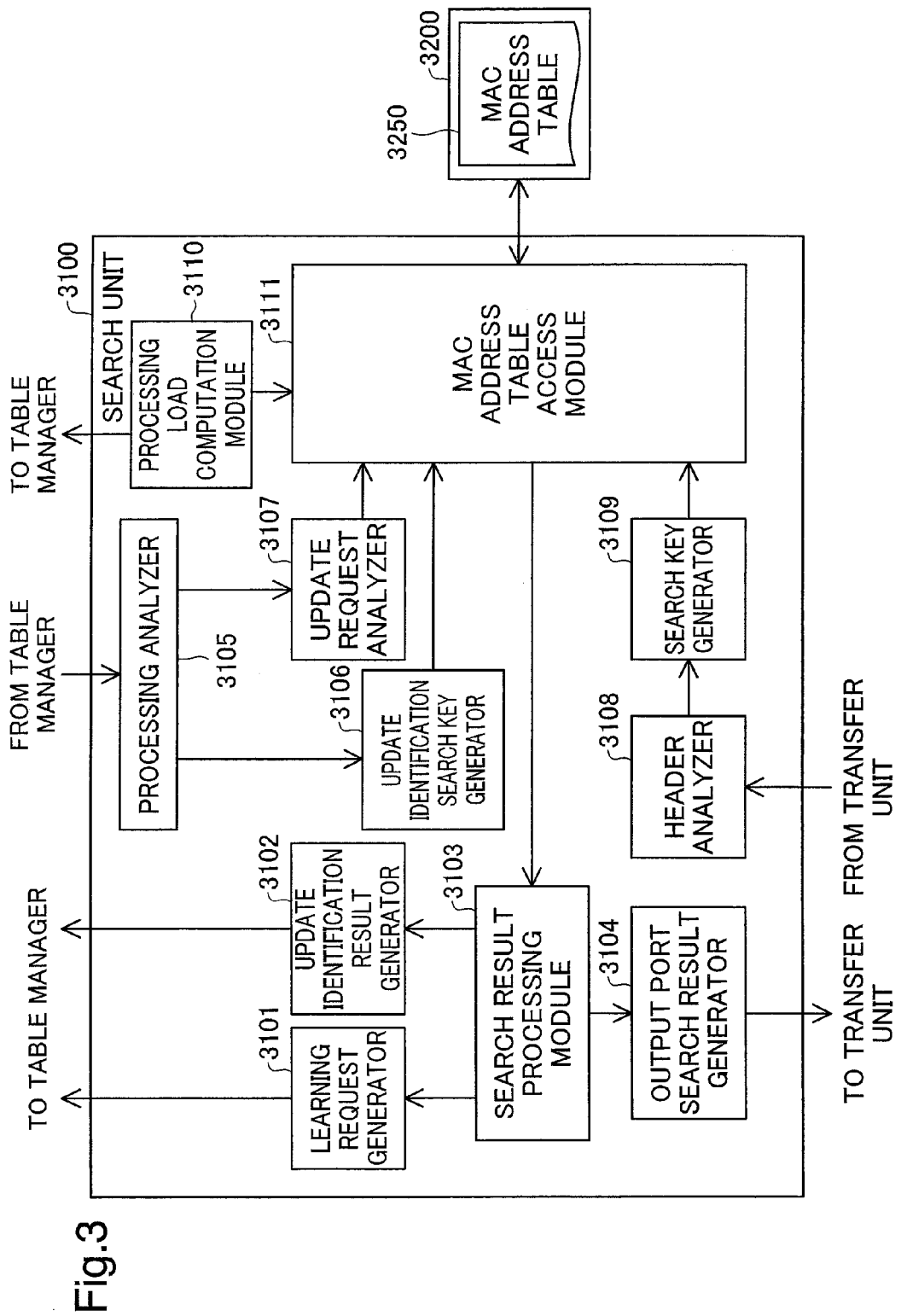
FIG. 3 is a block diagram showing the internal structure of a search unit included in the network switching device of FIG. 1.
Figure 4:
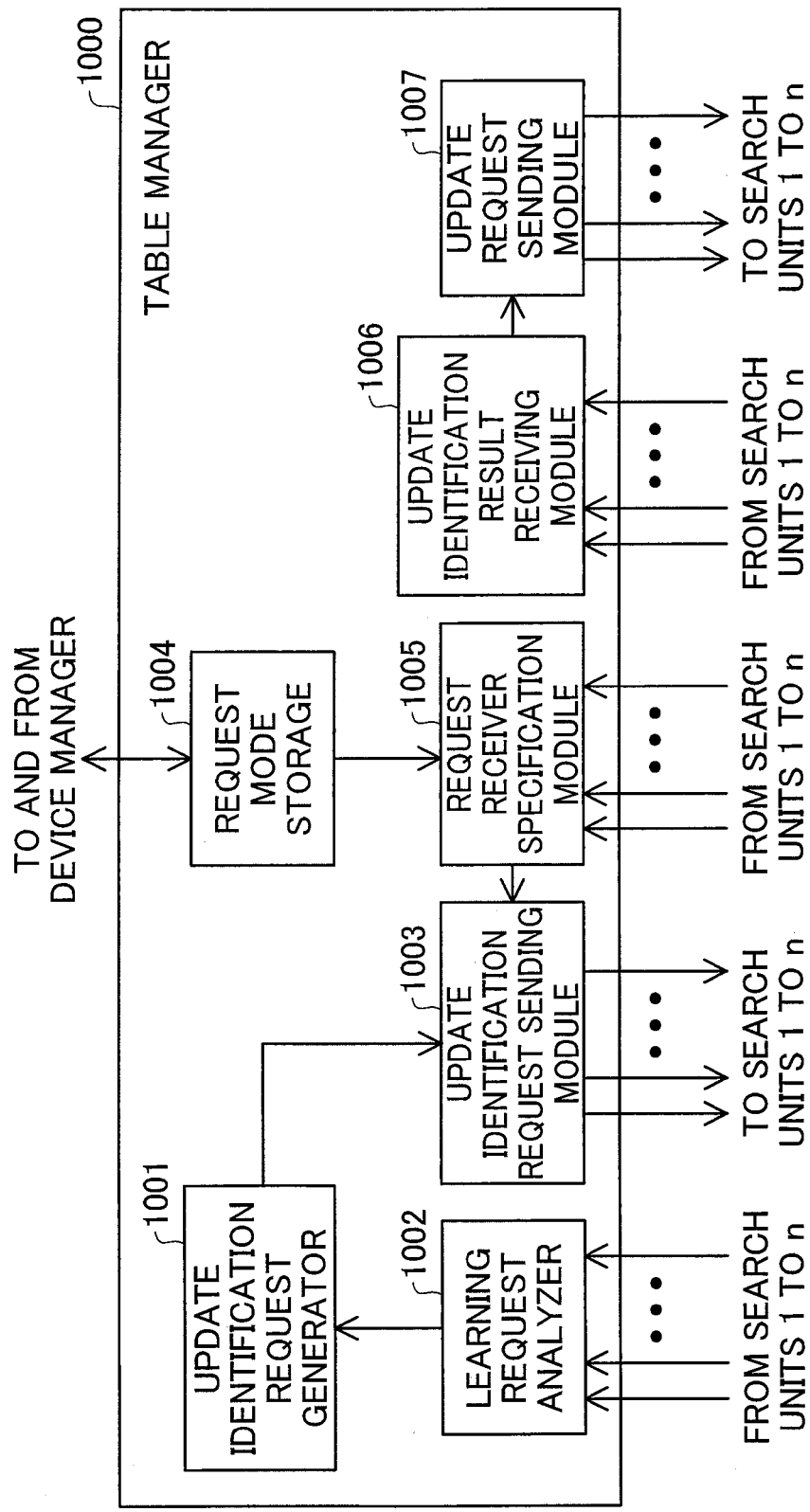
FIG. 4 is a block diagram showing the internal structure of a table manager included in the network switching device of FIG. 1.

Some modes of carrying out the invention are described below as preferred embodiments with reference to the accompanied drawings. The description first regards the configuration of a network switching device SW in a first embodiment of the invention with reference to FIGS. 1 through 4. FIG. 1 is a block diagram schematically illustrating the structure of the network switching device SW in the first embodiment. FIG. 2 shows one example of a MAC address table 3250 adopted in the network switching device SW. FIG. 3 is a block diagram showing the internal structure of a search unit 3100 included in the network switching device SW of FIG. 1. FIG. 4 is a block diagram showing the internal structure of a table manager 1000 included in the network switching device SW of FIG. 1.

As shown in FIG. 1, a network switching device SW of the first embodiment includes a table manager 1000, a crossbar switch 2000, multiple switching processor 3001 through 300*n*, and a device manager 5000.

The device manager 5000 is constructed as a computer that manages the operations of the whole network switching device SW.

The multiple switching processors 3001 through 300*n* have an identical structure. Each of the switching processors 300*a* through 300*n* includes a search unit 3100, a MAC address table storage 3200, a transfer unit 3300, and multiple ports.

The multiple ports function as interfaces for connection to a network via lines, such as coaxial cables or optical fibers, and are in conformity with the Ethernet (registered trademark) standard in this embodiment. Each of the switching processors 3001 through 300*n* has 'm' ports in this embodiment. The 'm' ports of the switching processor 3001 are respectively expressed as P1-1, P1-2, . . . , P1-*m*. Similarly the 'm' ports of the switching processor 3002 are expressed as P2-1, P2-2, . . . , P2-*m*, and the 'm' ports of the switching processor 300*n* are expressed as Pn-1, Pn-2, . . . , Pn-*m*. The port P1-1 is connected via a local area network LAN1 to a terminal T1 on the local area network LAN1. The port P2-1 is connected via a local area network LAN2 to a terminal T2 on the local area network LAN2. The port Pn-1 is connected via a local area network LANn to a terminal Tn on the local area network LANn.

The transfer unit 3300 includes a buffer 3350 constructed by a conventional memory. The transfer unit 3300 is connected to be communicable with the multiple ports and the search unit 3100 included in the corresponding self-belonging switching processor, which the transfer unit 3300 belongs to. The transfer unit 3300 in each switching processor is also connected to be communicable with the transfer units 3300 included in the other switching processors via the crossbar switch 2000.

The MAC address table storage 3200 is constructed by a conventional memory, for example, a CAM (content addressable memory). The MAC address table storage 3200 stores a MAC address table 3250 therein. As shown in FIG. 2, a mapping of each MAC address to one of the multiple ports is registered in the MAC address table 3250. In the illustrated example, the registry in the MAC address table 3250 represents a mapping of a MAC address MAC-T1 of the terminal T1 to the port P1-1 connecting with the terminal T1 (see entry E1 in FIG. 2). Similarly the registry in the MAC address table 3250 represents a mapping of a MAC address MAC-T2 of the terminal T2 to the port P2-1 and a mapping of a MAC address MAC-Tn of the terminal Tn to the port Pn-1 (see entries E2 and E3 in FIG. 2).

The search unit 3100 is connected to the MAC address table storage 3200 included in the corresponding self-belonging switching processor. The search unit 3100 searches the registry in the MAC address table 3250 with a preset search key and outputs the search result. For example, the search unit 3100 makes a search and identifies a port for sending a received frame among all ports included in the network switching device SW based on a destination MAC address included in the received frame. FIG. 3 shows the detailed structure of the search unit 3100. The search unit 3100 includes a learning request generator 3101, an update identification result generator 3102, a search result processing module 3103, a output port search result generator 3104, a processing analyzer 3105, an update identification search key generator 3106, an update request analyzer 3107, a header analyzer 3018, a search key generator 3109, a processing load computation module 3110, and a MAC address table access module 3111.

The table manager 1000 is connected with the multiple switching processors 3001 to 300n and manages the contents of the MAC address tables 3250 provided in the respective switching processors 3001 to 300n. FIG. 4 shows the detailed structure of the table manager 1000. The table manager 1000 includes an update identification request generator 1001, a learning request analyzer 1002, an update identification request sending module 1003, a request mode storage 1004, a request receiver specification module 1005, an update identification result receiving module 1006, and an update request sending module 1007.

The detailed functions of the respective search units 3100 and the table manager 1000 are described below in relation to the operations of the network switching device SW.

Operations of Network Switching Device

Figure 5:
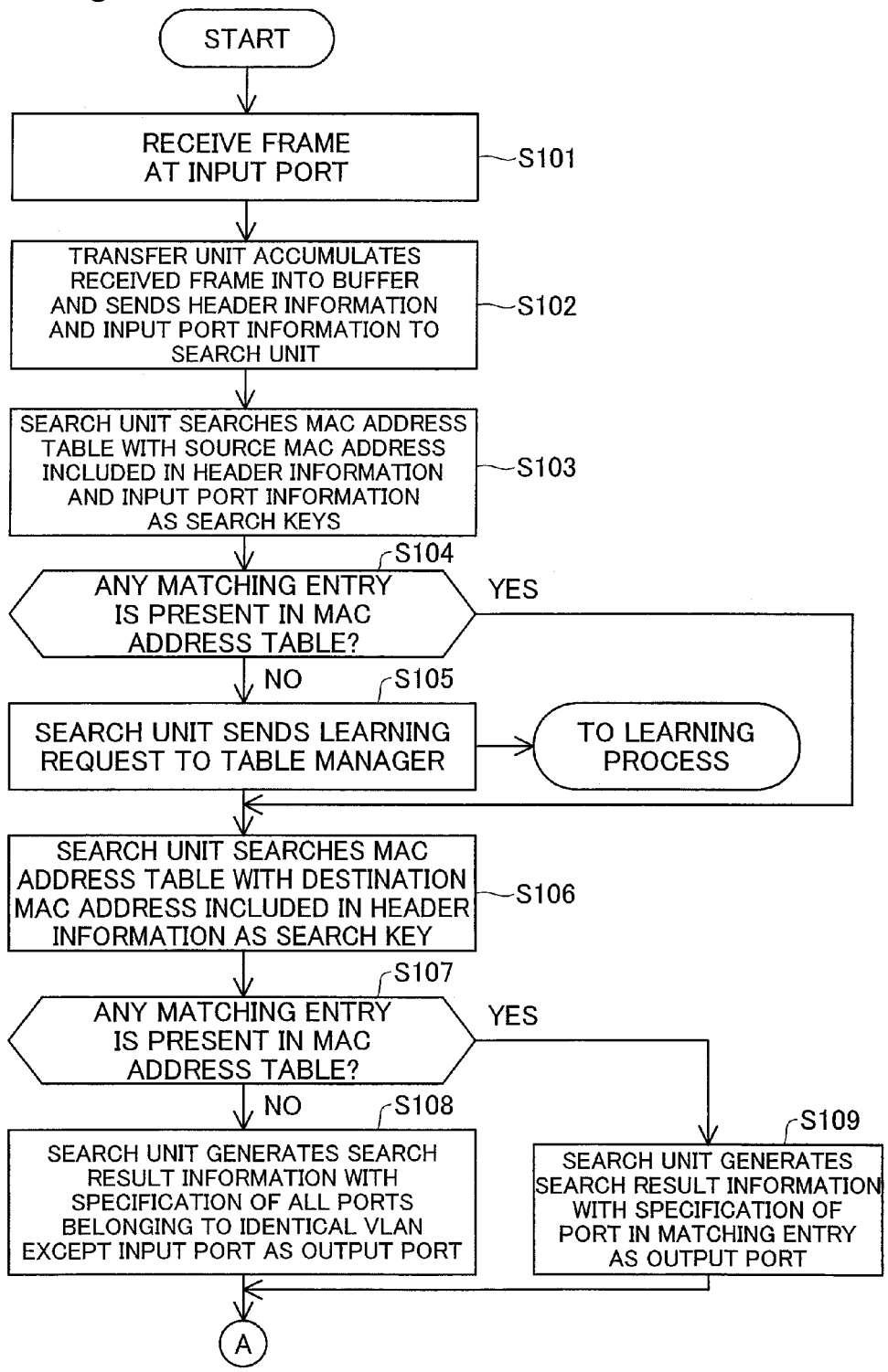
FIG. 5 is a flowchart showing a frame switching process routine executed in the first embodiment.
Figure 6:
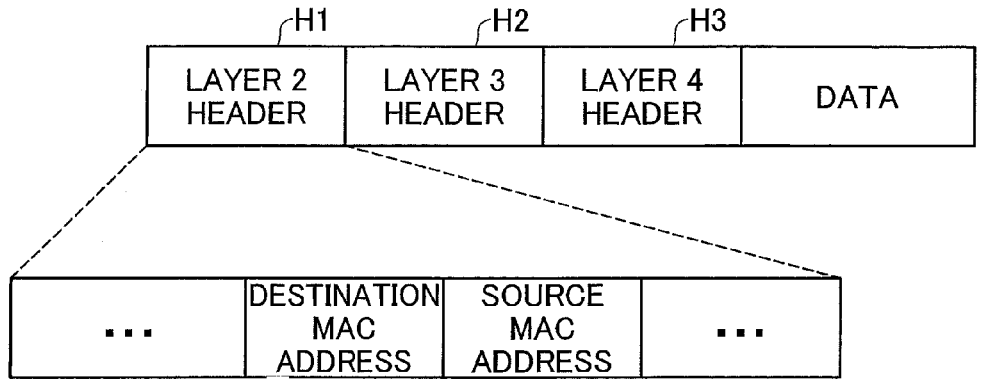
FIG. 6 is a conceptual view showing the structure of an Ethernet frame.
Figure 7:
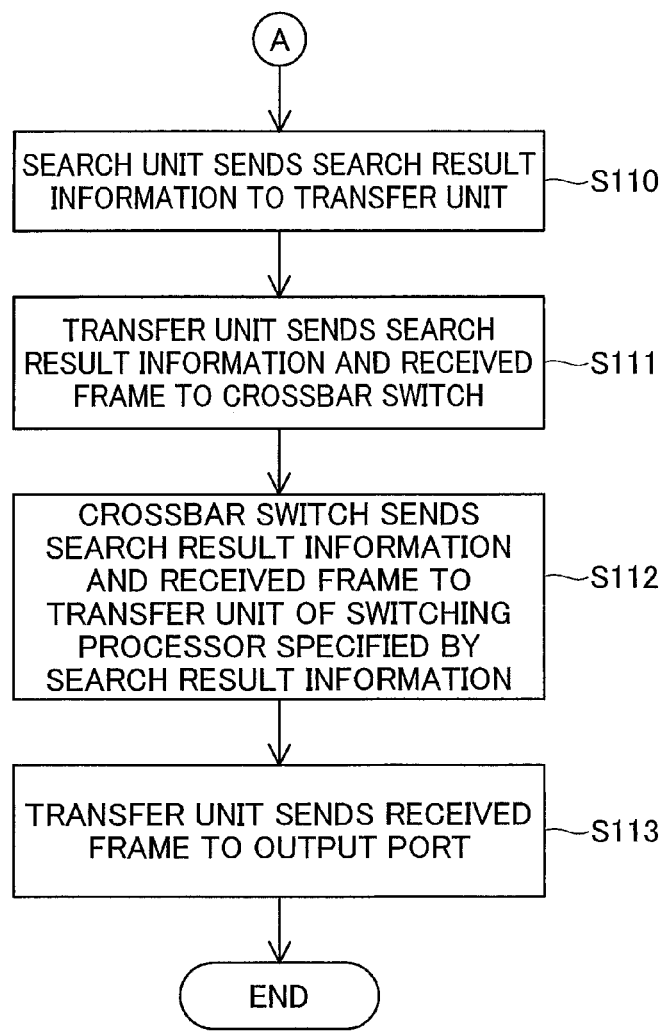
FIG. 7 is a flowchart showing continuation of the frame switching process routine executed in the first embodiment.

A series of frame switching process performed in the network switching device SW is described below with reference to FIGS. 5 through 7. FIG. 5 is a flowchart showing a frame switching process routine executed in the first embodiment. FIG. 6 is a conceptual view showing the structure of an Ethernet frame. FIG. 7 is a flowchart showing continuation of the frame switching process routine executed in the first embodiment.

In the frame switching process routine, the network switching device SW first receives a frame (an Ethernet frame in this embodiment) at one of the multiple ports (step S101). Among the multiple ports, a port receiving the Ethernet frame at this step is referred to as 'input port' in the description hereafter.

As shown in FIG. 6, the Ethernet frame includes object data to be sent and layer 2 to layer 4 headers H1 through H3. The layer 4 header H3 is a header of a transport layer in an OSI (open systems interconnection) reference model and has a format specified by a protocol of the transport layer. In this embodiment, TCP (transmission control protocol) or UDP (user datagram protocol) is adopted as the protocol of the transport layer, and the layer 4 header H3 is a TCP header or a UDP header. The layer 3 header H2 is a header of a network layer in the OSI reference model and has a format specified by a protocol of the network layer. In this embodiment, IP (Internet protocol) is adopted as the protocol of the network layer, and the layer 3 header H2 is an IP header. The layer 2 header H1 is a header of a data link layer of the OSI reference model and has a format specified by a protocol of the data link layer. In this embodiment, the Ethernet (registered trademark) is adopted as the protocol of the data link layer, and the layer 2 header H1 is an Ethernet header. The layer 2 header H1 (Ethernet header) includes a destination MAC address as a receiver of the Ethernet frame and a source MAC Address as a sender of the Ethernet frame as shown in FIG. 6.

Referring back to the flowchart of FIG. 5, at step S102, the transfer unit 3300 accumulates the received frame into the buffer 3350 and extracts header information included in the layer 2 header H1 from the received frame. The transfer unit 3300 then sends the extracted header information and input port information for identifying the input port to the search unit 3100 included in the corresponding self-belonging switching processor (step S102).

The search unit 3100 receives the header information and the input port information and makes a search in the registry of the MAC address table 3250 with a source MAC Address included in the received header information and the received input port information as search keys (step S103). According to the detailed procedure, the header analyzer 3108 of the search unit 3100 receives the header information and the input port information. The header analyzer 3108 extracts the source MAC Address from the received header information and sends the extracted source MAC Address and the received input port information to the search key generator 3109. The search key generator 3109 sends a search request with the source MAC Address and the input port information received from the header analyzer 3018 as search keys to the MAC address table access module 3111. The MAC address table access module 3111 searches the registry in the MAC address table 3250 in response to the search request received from the search key generator 3109 and sends a search result to the search result processing module 3103.

The search unit 3100 then determines whether the registry in the MAC address table 3250 includes an entry matching with the source MAC Address and the input port information specified as the search keys (step S104). The decision of step S104 represents determination of whether the MAC address table 3250 is to be updated with regard to the source MAC Address. In the presence of any matching entry (step S104: yes), the search unit 3100 shifts the frame switching process to step S106. In the absence of any matching entry (step S104: no), on the other hand, the search unit 3100 sends a learning request to the table manager 1000 (step S105) and then shifts the frame switching process to step S106. According to the detailed procedure, the search result processing module 3103 sends the search result received from the MAC address table access module 3111 to the learning request generator 3101. The learning request generator 3101 does not generate a learning request when the received search result represents the presence of any matching entry. The learning request generator 3101 generates a learning request including the source MAC Address and the input port information used as the search keys, on the other hand, when the received search result represents the absence of any matching key. The learning request generator 3101 sends the generated learning request to the table manager 1000. The table manager 1000 receives the learning request and performs a learning process as described later.

The search unit 3100 searches the registry in the MAC address table 3250 with a destination MAC address included in the header information as a search key (step S106). The search at this step is for specifying a port for sending the received frame among the multiple ports. A port for sending the received frame specified at this step is referred to as 'output port' in the description hereafter. The search unit 3100 searches the registry in the MAC address table 3250 to retrieve an entry including the destination MAC address and identifies a port mapped to the destination MAC address in the retrieved entry as the output port. According to the detailed procedure, the header analyzer 3108 extracts the destination MAC address from the header information and sends the extracted destination MAC address to the search key generator 3109. The search key generator 3109 sends a search request with the destination MAC address received from the header analyzer 3108 as a search key to the MAC address table access module 3111. The MAC address table access module 3111 searches the registry in the MAC address table 3250 in response to the search request received from the search key generator 3109 and sends a search result to the search result processing module 3103.

The search unit 3100 then determines whether the registry in the MAC address table 3250 includes an entry matching with the destination MAC address specified as the search key (step S107). In the presence of any matching entry (step S107: yes), the search unit 3100 generates search result information with specification of the port included in the matching entry as the output port (step S109). In the absence of any matching entry (step S107: no), on the other hand, the search unit 3100 generates search result information with specification of all the ports (excluding the input port) belonging to an identical VLAN (virtual LAN) with the input port as the output port (step S108). According to the detailed procedure, the search result processing module 3103 sends the search result received from the MAC address table access module 3111 to the output port search result generator 3104. The output port search result generator 3104 generates the search result information according to the received search result.

Referring to the flowchart of FIG. 7, the output port search result generator 3104 of the search unit 3100 sends the generated search result information to the transfer unit 3300 included in the corresponding self-belonging switching processor.

The transfer unit 3300 receives the search result information and sends the received search result information and the received frame accumulated in the buffer 3350 to the crossbar switch 2000 (step S111). The crossbar switch 2000 sends the search result information and the received frame to the transfer unit 3300 of the switching processor specified by the search result information among the multiple switching processors 3001 to 300n (step S112). For example, the frame received via port P1-1 as the input port and to be sent from P2-1 as the output port is sent from the transfer unit 3300 of the switching processor 3001 to the transfer unit 3300 of the switching processor 3002 via the crossbar switch 2000.

The transfer unit 3300 receives the search result information and the received frame and sends the received frame to the specified output port (step S113). The received frame is then sent from the output port to an external device corresponding to the destination MAC address.

Figure 8:
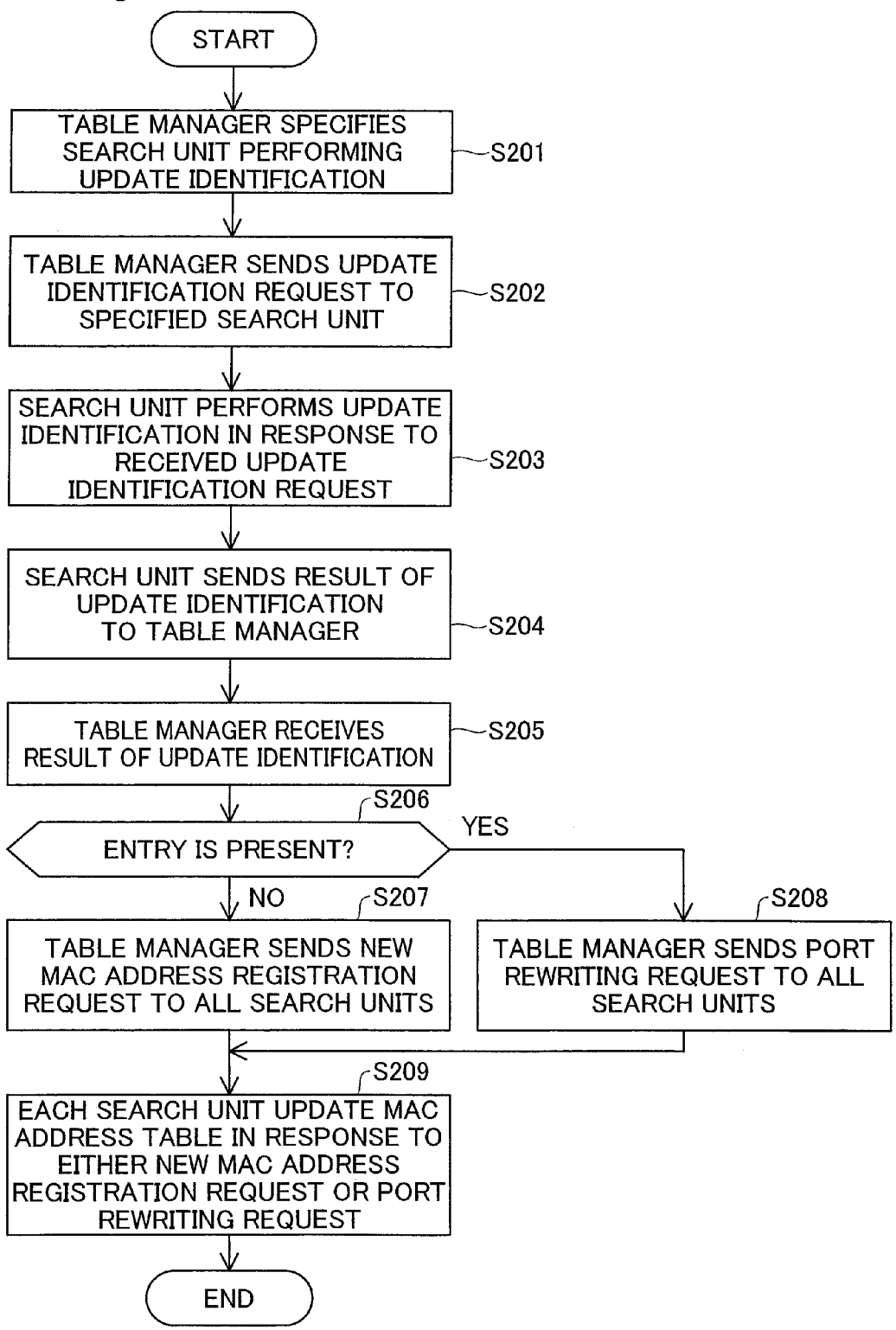
FIG. 8 is a flowchart showing a learning process routine.

The learning process performed in the network switching device SW is described in detail with reference to FIGS. 8 and 9. FIG. 8 is a flowchart showing a learning process routine. FIG. 9 shows an update of the MAC address table 3250.

The table manager 1000 starts the learning process in response to transmission of the learning request to the table manager 1000 and updates the contents of the MAC address table 3250 included in each of the switching processors 3001 through 300n. The learning request is received by the learning request analyzer 1002 and the request receiver specification module 1005 in the table manager 1000.

In the learning process routine, the table manager 1000 first specifies the search unit 3100 performing update identification, that is, the search unit 3100 as a receiver of an update identification request, among the search units 3100 included in the respective switching processors 3001 through 300n (step S201). According to the detailed procedure, the request mode storage 1004 has required information stored in advance for specifying the search unit 3100 performing the update identification. The required information is stored into the request mode storage 1004 via the device manager 5000 by the administrator of the network switching device SW. The request receiver specification module 1005 in the table manager 1000 obtains the required information from the request mode storage 1004 in response to reception of the learning request and specifies the search unit 3100 performing the update identification, based on the obtained information. The request receiver specification module 1005 notifies the update identification request sending module 1003 of the specified search unit 3100.

The information stored in advance in the request mode storage 1004 includes mode information for identifying a specification mode of specifying the search unit 3100 performing the update identification. There are four different specification modes applicable to specify the search unit 3100 performing the update identification:

1. fixing a selected search unit 3100 to the search unit 3100 performing the update identification;
2. specifying a search unit 3100 as the sender of the learning request to the search unit 3100 performing the update identification;
3. sequentially specifying the search units 3100 included in the respective switching processors 3001 to 300n to the search unit 3100 performing the update identification; and
4. monitoring a processing load of each search unit 3100 and specifying the a search unit 3100 with the lowest processing load to the search unit 3100 performing the update identification.

In the specification mode 1, information for identifying the fixed search unit 3100 is stored in advance in the request mode storage 1004. For example, a search unit 3100 having a low processing load may be fixed in advance to the search unit 3100 performing the update identification. In the specification mode 3, the search unit 3100 of the switching processor 3001 performs the update identification in response to a first learning request, the search unit 3100 of the switching processor 3002 performs the update identification in response to a second learning request, and the search unit 3100 of the switching processor 300n performs the update identification in response to an n-th learning request. In the specification mode 4, the processing load computation module 3110 of each switching processor 3100 computes the access frequency to the MAC address table 3250 per preset unit time and notifies the request receiver specification module 1005 of the table manager 1000 of a result of the computation. The request receiver specification module 1005 specifies a search unit 3100 having the notified least access frequency to the MAC address table 3250 per unit time to the search unit 3100 performing the update identification.

On specification of the search unit 3100 performing the update identification, the table manager 1000 sends an update identification request to the specified search unit 3100 (step S202). According to the detailed procedure, the learning request analyzer 1002 extracts a source MAC Address from the received learning request and sends the extracted source MAC Address to the update identification request generator 1001. The update identification request generator 1001 generates an update identification request including the received source MAC Address and sends the generated update identification request to the update identification request sending module 1003. The update identification request sending module 1003 sends the update identification request to the search unit 3100 notified by the request receiver specification module 1005.

The search unit 3100 receives the update identification request and performs the update identification in response to the received update identification request (step S203). The update identification identifies whether an update operation of the MAC address table 3250 to be performed in response to the learning request represents registration of a new MAC address (new registration) or update of a port corresponding to a registered MAC address (port rewriting). This update identification step is the process of identifying the update detail of the MAC address table 3250.

Figure 9A:
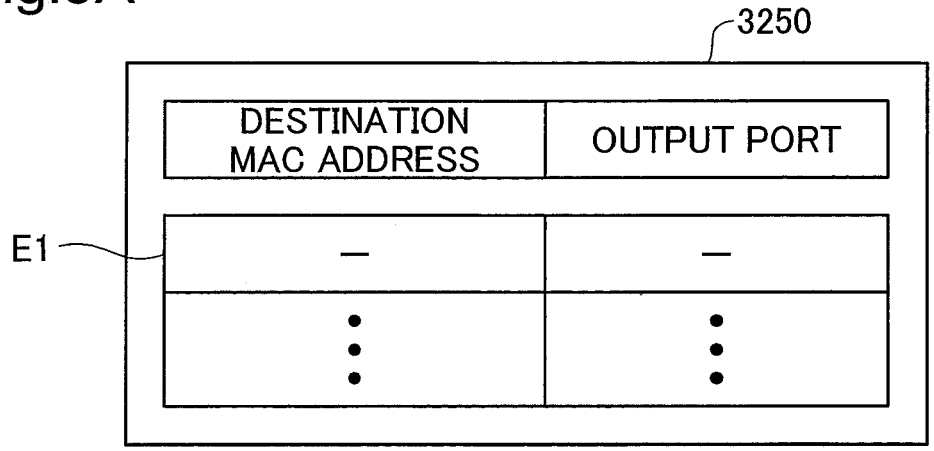
FIGS. 9A-C show an update of the MAC address table.

When the network switching device SW receives a frame including a source MAC Address that has not been registered as the destination MAC address in the MAC address table 3250, the new registration operation registers the relation between the source MAC Address and the input port as the mapping of the destination MAC address to the output port into the MAC address table 3250. For example, FIG. 9A shows the MAC address table 3250 with no entry prior to any learning. In this state, the network switching device SW receives a frame including the MAC address MAC-T1 as a source MAC Address, that is, a frame sent from the terminal T1 having the MAC address MAC-T1, at the port P1-1, the network switching device SW updates the registry in the MAC address table 3250 to add a new entry representing the relation between the MAC address MAC-T1 and the port P1-1 (see FIG. 9B). After the update, in response to reception of a frame including the MAC address MAC-T1 as a destination MAC address, the network switching device SW refers to the registry in the MAC address table 3250 and specifies the port P1-1 as the output port of the frame.

Figure 9B:
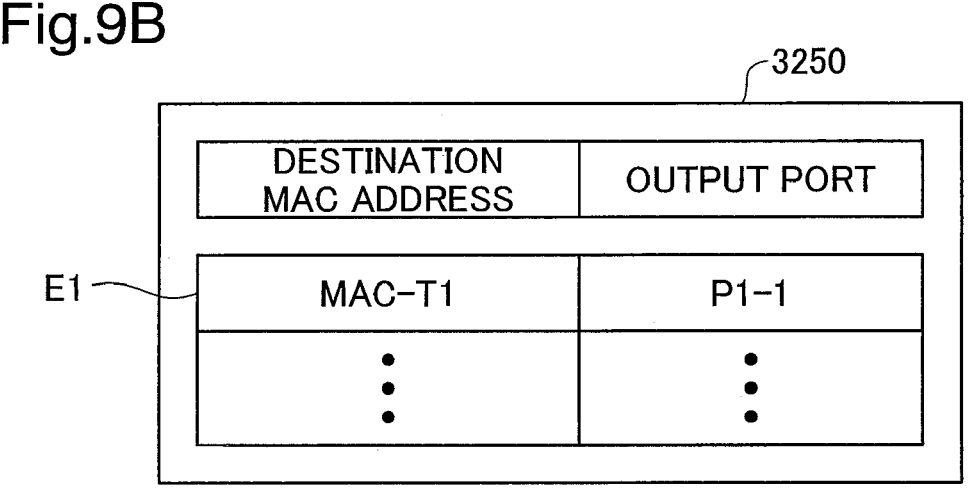
Figure 9C:
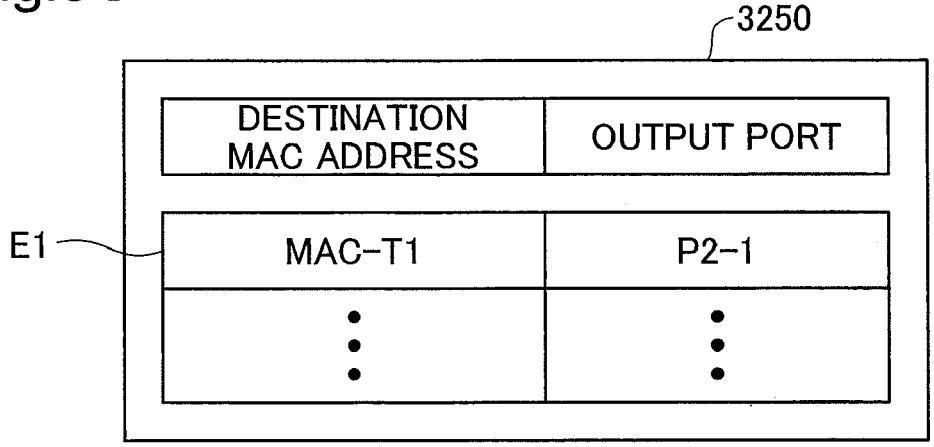

When the network switching device SW receives a frame including a source MAC Address that has been registered as the destination MAC address in the MAC address table 3250 at a different port, which is different from the port recorded as the output port corresponding to the registered MAC address in the MAC address table 3250, the port rewriting operation records the input port as a new output port corresponding to the registered MAC address into the MAC address table 3250. In the illustrated example of FIG. 1, the terminal T1 is connected to the local area network LAN1. In this case, as shown in FIG. 9B, the port P1-1 is registered as the output port corresponding to the MAC address MAC-T1 in the MAC address table 3250. It is assumed that the connection of the terminal T1 is then changed over from the local area network LAN1 to the local area network LAN2. This changeover of the connection changes the input port, which receives the frame sent from the terminal T1, from the port P1-1 to the port P2-1 (port change). After the changeover of the connection, when the network switching device SW receives a frame sent from the terminal T1 at the port P2-1, the entry E1 in the registry of the MAC address table 3250 is updated to change the output port corresponding to the MAC address MAC-T1 from the port P1-1 to the port P2-1 (see FIG. 9C).

According to the detailed procedure of the update identification process, the processing analyzer 3105 of the search unit 3100 receives an update identification request, extracts a source MAC Address from the received update identification request, and sends the extracted source MAC Address to the update identification search key generator 3106. The update identification search key generator 3106 sends a search request with the source MAC Address received from the processing analyzer 3105 as a search key to the MAC address table access module 3111. The MAC address table access module 3111 makes a search in the registry of the MAC address table 3250 in response to the search request received from the update identification search key generator 3106 and sends a search result to the search result processing module 3103.

The search unit 3100 then sends a result of the update identification to the table manager 1000 (step S204). According to the detailed procedure, the search result processing module 3013 sends the search result to the update identification result generator 3102. When the search result shows the presence of an entry including the destination MAC address that is identical with the source MAC Address used as the search key, the update identification result generator 3102 sends the search result representing the presence of an entry and the registration position of the entry as the result of the update identification to the table manager 1000. When the search result shows the absence of an entry including the destination MAC address that is identical with the source MAC Address used as the search key, on the other hand, the update identification result generator 3012 sends the search result representing the absence of an entry as the result of the update identification to the table manager 1000.

The update identification result receiving module 1006 of the table manager 1000 receives the result of the update identification (step S205). This receiving step is the process of acquiring the update detail of the MAC address table 3250. The update identification result receiving module 1006 then determines whether the search result received as the result of the update identification represents the presence of an entry or the absence of an entry (step S206).

In the presence of an entry (step S206: Yes), the table manager 1000 sends a port rewriting request to all the search units 3100 included in the respective switching processors 3001 through 300n (step S208). According to the detailed procedure, upon determination of the presence of an entry, the update identification result receiving module 1006 of the table manager 1000 generates a port rewriting request including the registration position of the entry as a rewriting object for changing the registry of the output port and the input port information and sends the generated port rewriting request to the update request sending module 1007. The update request sending module 1007 sends the port rewriting request received from the update identification result receiving module 1006 to all the search units 3100.

In the absence of an entry (step S206: No), on the other hand, the table manager 1000 sends a new MAC address registration request to all the search units 3100 (step S207). According to the detailed procedure, upon determination of the absence of an entry, the update identification result receiving module 1006 of the table manager 1000 generates a new MAC address registration request including the source MAC Address, which is to be newly registered as the destination MAC address into the MAC address table 3250, and the input port information and sends the generated new MAC address registration request to the update request sending module 1007. The update request sending module 1007 sends the new MAC address registration request received from the update identification result receiving module 1006 to all the search units 3100.

Each of the search units 3100 receives either the port rewriting request or the new MAC address registration request as an update request and updates the registry of the MAC address table 3250 in response to the received update request (step S209). According to the detailed procedure, the processing analyzer 3105 of the search unit 3100 receives the update request from the table manager 1000 and sends the received update request to the update request analyzer 3107. When the received update request represents the port rewriting request, the update request analyzer 3107 sends a write request including the registration position of the entry as the rewriting object and the input port information to the MAC address table access module 3111. When the received update request represents the new MAC address registration request, on the other hand, the update request analyzer 3107 sends a write request including the source MAC Address and the input port information to the MAC address table access module 3111. The MAC address table access module 3111 updates the registry in the MAC address table 3250 in response to the received write request.

As described above, in the network switching device SW of the first embodiment, the table manager 1000 simultaneously sends an update request for update of the MAC address table 3250 (either the port rewriting request or the new MAC address registration request) to the respective search units 3100 included in the multiple switching processors 3001 through 300n. Each of the search units 3100 updates the MAC address table 3250 under management in response to the received update request. This arrangement efficiently standardizes the contents of the respective MAC address tables 3250 stored in the multiple switching processors 3001 through 300n.

One of the search units 3100 included in the multiple switching processors 3001 through 300n performs the update identification to identify the update operation as either the new MAC address registration operation or the port rewriting operation in this embodiment. The table manager 1000 receives the identified update operation from one of the multiple switching processors 3001 through 300n that takes charge of the update identification. This arrangement does not require the table manager 1000 to have an independent MAC address table.

The table manager 1000 specifies the search unit 3100 identifying the update operation or performing the update identification among the multiple search units 3100 included in the multiple switching processors 3001 through 300n. The processes required for updating the MAC address table 325, that is, the process of determining the requirement for an update and the process of identifying the update operation, are distributable to plural different search units 3100. This arrangement ensures the high-speed update of the MAC address table 3250.

The table manager 1000 specifies the search unit 3100 performing the update identification according to one of the available specification modes mentioned above. The processing load for identifying each update operation is adequately distributed to the specified search unit 3100 by taking into account the processing loads for relay of frames in the respective search units 3100. This arrangement ensures the higher-speed update of the registry in the MAC address table 3250.

B. Second Embodiment

Figure 10:
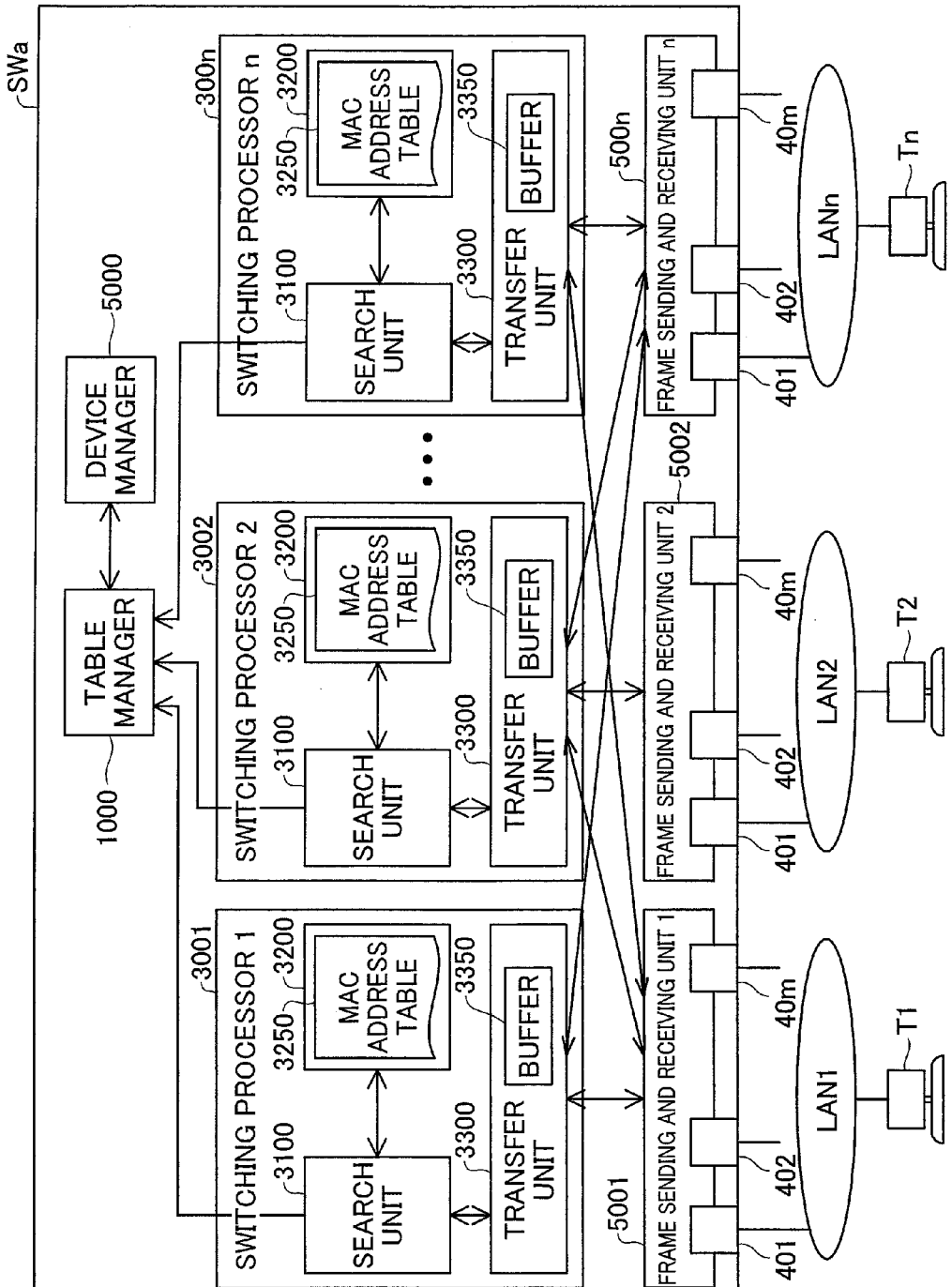
FIG. 10 is a block diagram schematically illustrating the structure of a network switching device in a second embodiment of the invention.

The configuration of a network switching device SWa in a second embodiment of the invention is described with reference to FIG. 10. FIG. 10 is a block diagram schematically illustrating the structure of the network switching device SWa in the second embodiment. In the network switching device SW of the first embodiment, the multiple switching processors 3001 through 300n are mutually connected via the crossbar switch 2000. In the network switching device SWa of the second embodiment, however, the multiple switching processors 3001 through 300n are not mutually connected. In the network switching device SW of the first embodiment, each of the multiple ports is connected to the transfer unit 3300 in one of the multiple switching processors 3001 through 300n. The network switching device SWa of the second embodiment has multiple frame sending and receiving units 5001 through 500n. Each of the multiple ports is connected to one of the multiple frame sending and receiving units 5001 through 500n. Each of the multiple frame sending and receiving units 5001 through 500n is connected to all the multiple switching processors 3001 through 300n to allow communication therebetween. Otherwise the network switching device SWa of the second embodiment has the similar structure to that of the network switching device SW of the first embodiment including the internal structure of each of the switching processors 3001 through 300n and the internal structure of the table manager 1000. These structures are described previously with reference to FIGS. 1 through 4 and are not specifically described here.

Figure 11:
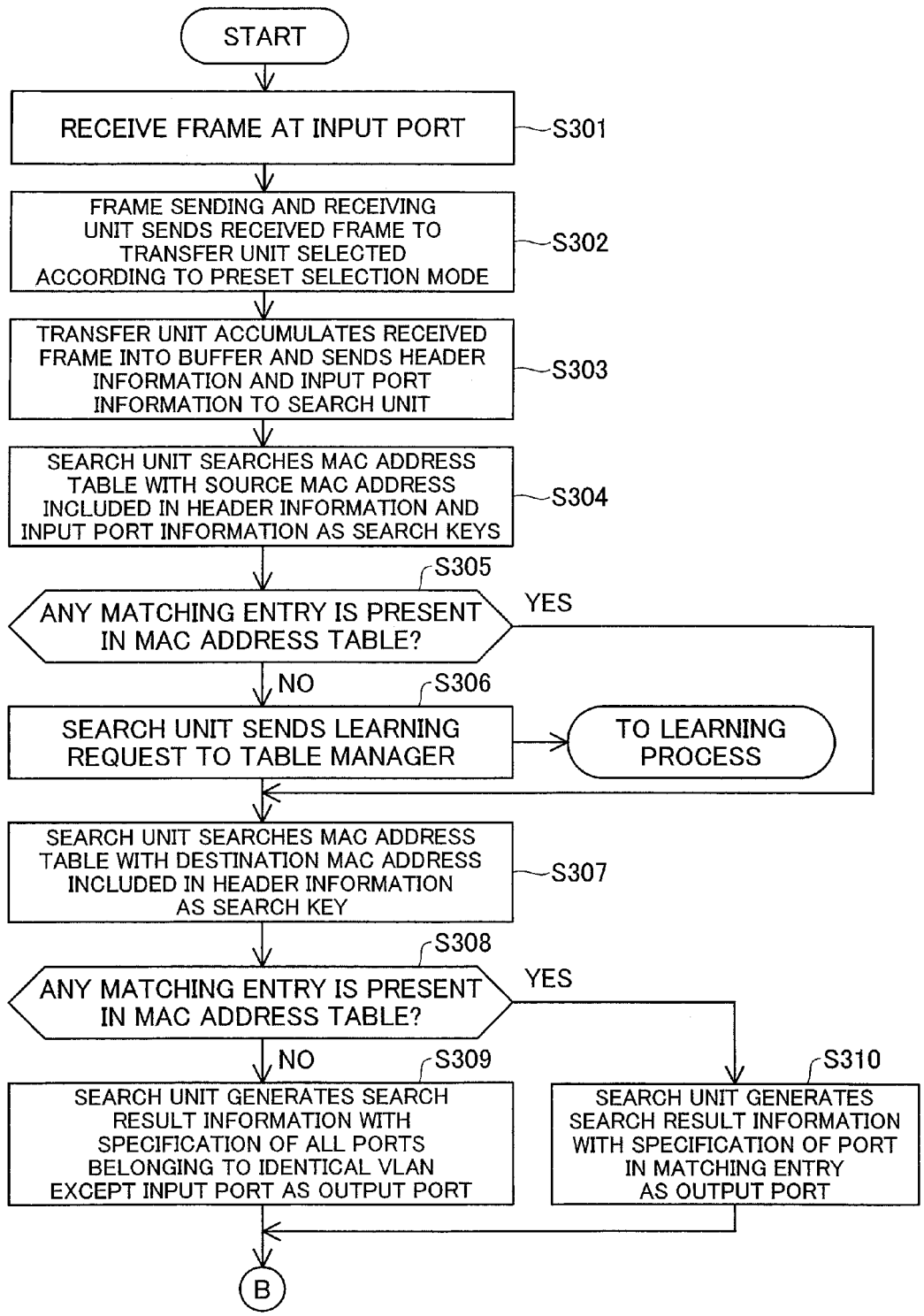
FIG. 11 is a flowchart showing a frame switching process routine executed in the second embodiment.
Figure 12:
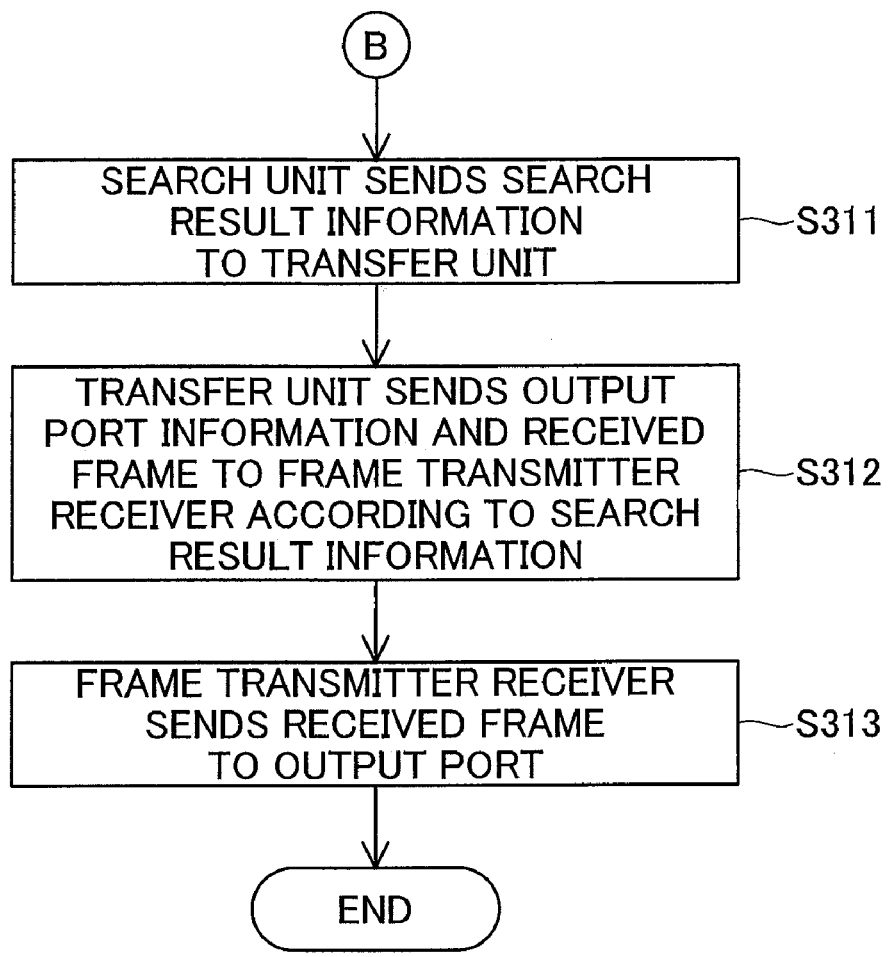
FIG. 12 is a flowchart showing continuation of the frame switching process routine executed in the second embodiment.

A series of frame switching process performed in the network switching device SWa of the second embodiment is described below with reference to FIGS. 11 and 12. FIG. 11 is a flowchart showing a frame switching process routine executed in the second embodiment. FIG. 12 is a flowchart showing continuation of the frame switching process routine executed in the second embodiment.

The frame switching process of the second embodiment is described with focus on differences from the frame switching process of the first embodiment described previously with reference to FIGS. 5 to 7. In the frame switching process routine of the second embodiment, the network switching device SWa first receives an Ethernet frame (see FIG. 6) at one of the multiple ports as the input port (step S301), like the frame switching process routine of the first embodiment.

The frame sending and receiving unit corresponding to the input port among the multiple frame sending and receiving units 5001 through 500n sends the received frame to a specified one of the transfer units 3300 included in the multiple switching processors 3001 through 300n (step S302). The transfer unit 3300 as a transmission destination of the received frame is selected in advance according to a predetermined selection mode among the respective transfer units 3300 included in the multiple switching processors 3001 through 300n. The transfer unit 3300 as the transmission destination may be fixed for each of the multiple frame sending and receiving units 5001 through 500n. Another available selection mode may monitor the processing load of the switching processor corresponding to each transfer unit 3300 and specify the transfer unit 3300 corresponding to a switching processor having a lower processing load to the transmission destination.

The processing flow of steps S303 to S311 in the frame switching process routine of the second embodiment, that is, from reception of the frame by the specified transfer unit 3300 to reception of the search result information by the transfer unit 3300, is identical with the processing flow of steps S102 to S110 in the frame switching process routine of the first embodiment described previously and is thus not specifically described here.

The transfer unit 3300 receives the search result information, specifies the frame transmitter receiver connecting with the output port among the multiple frame transmitter receivers 5001 through 500n according to the received search result information, and sends output port information and the received frame accumulated in the buffer 3350 to the specified frame transmitter receiver (step S312).

The specified frame transmitter receiver receives the output port information and the received frame and sends the received frame to the specified output port (step S313). The received frame is then sent from the output port to an external device corresponding to the destination MAC address.

The learning process performed in the network switching device SWa of the second embodiment is identical with the learning process performed in the network switching device SW of the first embodiment described previously with reference to FIGS. 8 and 9 and is thus not specifically described here.

The network switching device SWa of the second embodiment has substantially the same functions and effects as those of the network switching device SW of the first embodiment.

C. Variations

First Variation

In the embodiments described above, MAC addresses are used as the address of the data link layer. This is because the network interconnecting the respective devices adopts the Ethernet (registered trademark) as the protocol of the data link layer in the embodiment. In the case of application of another protocol to the protocol of the data link layer, addresses generally used in the applied protocol may be used as the address of the data link layer.

Second Variation

The network switching device SW (SWa) of the embodiment may additionally have a layer 3 switching function which is performed based on a 'destination IP address included in the layer 3 header H2 of a frame, in addition to the layer 2 switching function which is based on the destination MAC address as described above. For example, when the destination MAC address included in a received frame is not identical with a MAC address assigned to the input port, the network switching device SW may perform the layer 2 switching. When the destination MAC address included in the received frame is identical with the MAC address assigned to the input port, on the other hand, the network switching device SW may perform the layer 3 switching. In this modified structure, each of the multiple switching processors 3001 through 300n stores a routing table representing the mapping of each destination IP address to a transfer destination, in addition to the MAC address table 3250. The network switching device SW refers to the routing table to specify the transfer destination in the case of the layer 3 switching.

Third Variation

In the network switching device SW (SWa) of the embodiment, the multiple switching processors 3001 through 300n are provided in a single casing. In one modified structure, one switching processor 2001 and multiple ports are provided in each of multiple casings. The multiple casings are interconnected via a cable to constitute one network switching device (like as stackable switch). In this variation, the table manager 1000 and the device manager 5000 may be provided in one of the multiple casing or may alternatively be provided in a different casing from the multiple casings respectively having the switching processor 3001.

Fourth Variation

In the network switching devices SW and SWa of the first and the second embodiments described above, the search unit 3100 makes a search in the registry of the MAC address table 3250 with the destination MAC address as a search key and specifies a output port for sending the received frame (step S106 in the flowchart of FIG. 5). In one possible modification, the search unit 3100 may search the registry in the MAC address table with a VLAN Identification and a destination MAC address as search keys and specify the output port. The VLAN Identification represents information for identifying the VLAN of the received frame. Such modification is described as a fourth variation with reference to FIG. 13. FIG. 13 shows a MAC address table and a VLAN table adopted in the fourth variation.

In a network switching device of the fourth variation, a MAC address table storage in each of multiple switching processors stores a MAC address table 3250a and a VLAN table 3260 shown in FIG. 13, in place of the MAC address table 3250 shown in FIG. 2. Otherwise the structure of the network switching device of the fourth variation is identical with either the structure of the network switching device SW of the first embodiment or the structure of the network switching device SWa of the second embodiment described above.

In the first and the second embodiments, the MAC address table 3250 (see FIG. 2) has the registry of the mapping of the destination MAC address as destination information to the output port. The MAC address table 3250a of the fourth variation has the registry of the mapping of the VLAN Identification and the destination MAC address as destination information to the output port. Namely each combination of a destination MAC address and a VLAN Identification is mapped to a output port and is registered in the MAC address table 3250 as shown in FIG. 13A.

The VLAN table 3260 defines the VLAN. This variation adopts a port VLAN system that assigns a VLAN Identification to each port. As shown in FIG. 13B, the VLAN table 3260 has the registry of the mapping of each port to a VLAN Identification assigned to the port.

In the network switching device of the fourth variation, the search unit 3100 makes a search in the VLAN table 3260 with the input port receiving the received frame as a search key and obtains the VLAN Identification assigned to the VLAN of the received frame. The search unit 3100 then makes a search in the MAC address table 3250a with the source MAC Address of the received frame, the VLAN Identification, and the input port as search keys and determines the requirement or the non-requirement of the learning process. This is equivalent to the processing of step S103 for determining the requirement or non-requirement for the learning process in the frame switching process routine of the first embodiment (FIG. 5).

The search unit 3100 searches the MAC address table 3250a with the destination MAC address of the received frame and the VLAN Identification as search keys and specifies the output port. This is equivalent to the processing of step S106 for specifying the output port in the frame switching process routine of the first embodiment (FIG. 5).

The search unit 3100 makes a search in the MAC address table 3250a to determine the presence or the absence of an entry including the combination of the source MAC Address and the VLAN Identification and identifies the update operation as either a new registration operation or a port rewriting operation. This is equivalent to the processing of step S203 for identifying the update operation in the learning process (FIG. 8).

The network switching device of the fourth variation efficiently standardizes and promptly updates the registries in the respective MAC address tables 3250a, like the first embodiment and the second embodiment described above.

The fourth variation described the port VLAN system. The port VLAN system is, however, not essential. One available example is a tag VLAN system. The tag VLAN system inserts tag information representing the VLAN Identification in a layer 2 header of a received frame and discriminates the VLAN in the frame unit. In this case, the search unit 3100 may extract the tag information from the header information received from the transfer unit 3300 to obtain the VLAN Identification. Other available examples include a MAC-based VLAN system that assigns a VLAN Identification to each source MAC Address of the received frame and a subnet-based VLAN system that assigns a VLAN Identification to each source IP address of the received frame. In these cases, a MAC address or an IP address may be mapped to each VLAN Identification and registered in the VLAN table 3260.

Other Variations

In the above embodiments, part of the functions actualized by the hardware configuration may be attained by the software configuration. On the contrary, part of the functions actualized by the software configuration may be attained by the hardware configuration.

The embodiments and their variations discussed above are to be considered in all aspects as illustrative and not restrictive. There may be many other modifications, changes, and alterations without departing from the scope or spirit of the main characteristics of the present invention. All changes within the meaning and range of equivalency of the claims are intended to be embraced therein. The scope and spirit of the present invention are indicated by the appended claims, rather than by the foregoing description.

What is claimed is:

1. A network switching device, comprising:
   multiple ports for receiving and sending data;
   multiple switching processors, each having a storage, an output port specification module, an update requirement determination module, and a table update module,
   wherein the storage stores an address table recording a mapping of destination information including a destination address to one of the multiple ports, the output port specification module refers to at least a destination address included in the received data and the address table and further specifies an output port for sending the received data among the multiple ports, the update requirement determination module determines requirement or non-requirement for an update of the address table with regard to a source address included in the received data, and the table update module updates the address table in response to an update request; and
   a table manager for standardizing address tables respectively stored in the multiple switching processors based on an update detail of the address table that is received from at least one of the multiple switching processors, the table manager having an update detail acquisition module and an update request module, for receiving into the update detail acquisition module an update detail of the address table from at least one of the multiple switching processors upon determination of the requirement for update of the address table by the update requirement determination module in one of the multiple switching processors, and for simultaneously sending from the update request module the update request to each of the multiple switching processors, based on the obtained update detail.

2. The network switching device in accordance with claim 1, wherein at least one of the multiple switching processors has an update detail identification module that identifies the update detail in response to an identification request, and
   wherein the update detail acquisition module includes:
   an identification request sending module that sends the identification request to one of the at least one of the multiple switching processors, and
   an update detail receiving module that receives the identified update detail from one of the multiple switching processors which has the update detail identification module.

3. The network switching device in accordance with claim 2, wherein the update detail identification module identifies the update detail as either a new registration operation to newly register the mapping of a new address or a rewriting operation to rewrite the mapping of a registered address.

4. The network switching device in accordance with claim 2, wherein the table manager of plural switching processors among the multiple switching processors have the update detail identification module, and
   wherein the update detail acquisition module specifies a destination of the identification request after receiving the identification request upon determination of the requirement for update of the address table by the update requirement determination module in one of the multiple switching processors, and has a receiver specification module that specifies a receiver as a destination of sending the identification request among the plural switching processors having the update detail identification module.

5. The network switching device in accordance with claim 4, wherein the receiver specification module specifies a pre-determined switching processor as the receiver among the plural switching processors having the update detail identification module.

6. The network switching device in accordance with claim 4, wherein the receiver specification module monitors a processing load in each of the plural switching processors having the update detail identification module and specifies a switching processor having a lower processing load among the plural switching processors having the update detail identification module as the receiver.

7. The network switching device in accordance with claim 4, wherein the receiver specification module sequentially specifies the plural switching processors having the update detail identification module as the receiver.

8. The network switching device in accordance with claim 1, wherein the address is an address of a data link layer.

9. The network switching device in accordance with claim 1, wherein the destination information includes Virtual Local Area Network (VLAN) identification for identifying a VLAN, in addition to the destination address, and
   wherein the output port specification module specifies the output port for sending the received data among the multiple ports, based on the destination address of the received data and the VLAN identification information for identifying a VLAN of the received data.

10. A control method of a network switching device having multiple ports for receiving and sending data,
   the network switching device having multiple switching processors and a table manager,
   each of the multiple switching processors having a storage that stores an address table recording a mapping of destination information including a destination address to one of the multiple ports, and a output port specification module that refers to at least a destination address included in received data and the address table and specifies a output port for sending the received data among the multiple ports,
   the control method comprising:
   causing one of the multiple switching processors to determine requirement or non-requirement for update of the address table with regard to a source address included in the received data;

upon determination of the requirement for update of the address table by one of the multiple switching processors, causing the table manager to obtain an update detail of the address table from one of the multiple switching processors;

causing the table manager to send an update request of the address table to each of the multiple switching processors, based on the obtained update detail; and causing each of the multiple switching processors to standardize contents of the address table of each of the multiple switching processors based on an update detail of the address table that is received from at least one of the multiple switching processors by simultaneously updating the corresponding address table in response to the update request.

* * * * *